(12) United States Patent
Lagarde et al.

(10) Patent No.: US 10,427,476 B2
(45) Date of Patent: Oct. 1, 2019

(54) TIRE FOR A HEAVY DUTY VEHICLE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Patricia Lagarde, Clermont-Ferrand (FR); David Lavialle, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 548 days.

(21) Appl. No.: 14/408,387

(22) PCT Filed: Jun. 13, 2013

(86) PCT No.: PCT/EP2013/062220
§ 371 (c)(1),
(2) Date: Dec. 16, 2014

(87) PCT Pub. No.: WO2013/189820
PCT Pub. Date: Dec. 27, 2013

(65) Prior Publication Data
US 2015/0144242 A1 May 28, 2015

(30) Foreign Application Priority Data
Jun. 18, 2012 (FR) ...................................... 12 55671

(51) Int. Cl.
*B60C 1/00* (2006.01)
*B60C 15/06* (2006.01)
(Continued)

(52) U.S. Cl.
CPC ................ *B60C 15/06* (2013.01); *B60C 1/00* (2013.01); *B60C 15/0603* (2013.01); *C08K 3/04* (2013.01);
(Continued)

(58) Field of Classification Search
CPC ....... B60C 15/06; B60C 1/00; B60C 15/0603; B60C 2015/065; B60C 2001/005;
(Continued)

(56) References Cited

U.S. PATENT DOCUMENTS 6,455,624 B1 * 9/2002 Serre .......................... B60C 1/00
152/209.16
6,880,600 B1 * 4/2005 Bidet .................... B60C 1/0008
152/510

(Continued)

FOREIGN PATENT DOCUMENTS

FR 2940187 6/2010
FR 2968601 A1 6/2012
(Continued)

OTHER PUBLICATIONS

International Search Report for PCT/EP2013/062220 dated Jul. 11, 2013.
(Continued)

*Primary Examiner* — Seyed Masoud Malekzadeh
(74) *Attorney, Agent, or Firm* — Dickinson Wright PLLC

(57) ABSTRACT

A tire which is intended to bear heavy loads and the endurance of which is improved. The tire contains, in the bead region, at least one internal annular insert, the said insert having a rubber composition containing a polyisoprene elastomer, between 45 phr and 60 phr of a reinforcing filler containing from 43 to 55 phr of a reinforcing inorganic filler with a BET specific surface of between 155 and 185
(Continued)

m²/g, and a coupling agent for bonding the reinforcing inorganic filler to the elastomer.

15 Claims, 1 Drawing Sheet

(51) Int. Cl.
| | | |
|---|---|---|
| *C08L 7/00* | (2006.01) | |
| *C08L 9/00* | (2006.01) | |
| *C08K 3/04* | (2006.01) | |
| *C08K 3/36* | (2006.01) | |
| *C08K 5/548* | (2006.01) | |
| *C08L 71/02* | (2006.01) | |

(52) U.S. Cl.
CPC .............. *C08K 3/36* (2013.01); *C08K 5/548* (2013.01); *C08L 7/00* (2013.01); *C08L 9/00* (2013.01); *C08L 71/02* (2013.01); *B60C 2001/005* (2013.01); *B60C 2001/0058* (2013.01); *B60C 2015/065* (2013.01); *B60C 2015/0614* (2013.01); *B60C 2015/0621* (2013.01); *B60C 2015/0625* (2013.01)

(58) Field of Classification Search
CPC .... B60C 2015/0625; B60C 2001/0058; B60C 2015/0621; B60C 2015/0614
USPC ........................................... 152/541
See application file for complete search history.

(56) References Cited

U.S. PATENT DOCUMENTS

| | | | | |
|---|---|---|---|---|
| 7,241,824 B2* | 7/2007 | Mangeret | .............. | C08K 5/54 |
| | | | | 152/905 |
| 7,250,463 B2* | 7/2007 | Durel | .................... | B60C 1/0016 |
| | | | | 152/450 |
| 7,262,254 B2* | 8/2007 | Zanzig | .................. | B60C 1/0016 |
| | | | | 524/492 |
| 7,488,768 B2* | 2/2009 | Tardivat | ................ | B60C 1/0016 |
| | | | | 152/209.1 |
| 7,588,065 B2* | 9/2009 | Serre | ......................... | B60C 1/00 |
| | | | | 152/547 |
| 7,799,862 B2* | 9/2010 | Chauvin | .................. | B60C 1/00 |
| | | | | 152/151 |
| 7,891,394 B2* | 2/2011 | Zanzig | ..................... | B60C 1/00 |
| | | | | 152/458 |
| 2004/0103968 A1 | 6/2004 | Burlacot | | |
| 2005/0016651 A1* | 1/2005 | Durel | .................... | B60C 1/0016 |
| | | | | 152/209.1 |
| 2011/0203712 A1* | 8/2011 | Araujo Da Silva | ... | C08K 5/005 |
| | | | | 152/537 |
| 2011/0303338 A1* | 12/2011 | Araujo Da Silva | . | C08K 3/0033 |
| | | | | 152/537 |
| 2012/0073724 A1 | 3/2012 | Bertran | | |

FOREIGN PATENT DOCUMENTS

| | | |
|---|---|---|
| JP | 2009-114385 | 5/2009 |
| WO | 02096674 | 12/2001 |

OTHER PUBLICATIONS

Database WPI Week 200938 Thomson Scientific, London, GB; AN 2009-J68758 XP002686298 & JP 2009 114385 a Sumimoto Rubber Ltd May 28, 2009.

* cited by examiner

TIRE FOR A HEAVY DUTY VEHICLE

This application is a 371 national phase entry of PCT/EP2013/062220, filed 13 Jun. 2013, which claims priority to French Patent Application No. 1255671, filed 18 Jun. 2012, the entire contents of which are incorporated herein by reference for all purposes.

BACKGROUND

1. Field

The disclosure relates to a tire, in particular intended to bear heavy loads, such as a tire intended to equip vehicles such as heavy duty vehicles or earthmoving equipment.

2. Description of Related Art

A tire normally comprises two beads intended to come into contact with a wheelrim, a crown surmounted by a tread intended to come into contact with the ground and sidewalls connecting this crown to each bead. Furthermore, a tire is generally reinforced by a carcass reinforcement, the carcass reinforcement being anchored in each bead to a bead reinforcing circumferential element.

The term "meridian section" is understood to mean a cross section through a meridian plane passing through the axis of rotation of the tire.

Each bead comprises at least one internal annular insert, the meridian section of which is of elongated general shape and which exhibits faces joining to give a point or end (also known as apex) which is located radially outside the bead reinforcing circumferential element. The term "internal annular insert" is understood to mean an annular insert which does not exhibit a visible face when the tire is not fitted to an external wheelrim and which does not come into direct contact with the wheelrim. These bead annular inserts consist of rubber-based compositions.

The tires intended to equip vehicles bearing heavy loads at relatively high speeds, such as heavy duty vehicles or earthmoving equipment, are designed to be able to be retreaded when the tread is worn. The possibility of retreading involves having available a worn tire which has not experienced major damage, such as cracks in the semi-finished products which make up the tire. To this end, it is desirable for the cohesion of the materials forming the internal annular inserts to be as high as possible in order to prevent or reduce the risk of formation of incipient cracks which might propagate up to the external surface of the tire (it being known that the external surface of the tire denotes any surface of the tire visible to the observer when this tire is not fitted to its wheelrim).

However, it is known to a person skilled in the art that internal annular inserts are subjected to deformations at each turn of the wheel. These deformations generate high heating of the materials making up these inserts, which accelerates their thermal-chemical or thermal-oxidative ageing. This ageing has the effect of reducing the cohesion of the internal annular inserts, which is reflected by a poorer endurance of the tire.

In order to confer the best possible endurance on the tire, the internal annular insert should exhibit a sufficient level of cohesion at the start and the least possible change with use.

In order to increase the cohesion of an internal annular insert, one solution consists in increasing the content of reinforcing filler of rubber composition which forms the internal annular insert. However, this increase in the content of reinforcing filler increases the hysteresis of the rubber composition, which is reflected by a heating of the internal annular insert which is damaging to the endurance of the tire.

Thus, provision has been made to use rubber compositions of relatively low hysteresis comprising low contents of reinforcing fillers for the preparation of internal annular inserts, such as is described, for example, in U.S. Pat. No. 3,392,773 and Patent EP 1 028 007. In particular, Patent EP 1 028 007 teaches that the content of reinforcing inorganic filler in the rubber composition of an internal annular insert of a tire should not exceed 40 phr and preferably should not be greater than 35 phr, in order for the rubber composition to exhibit an optimized compromise between the cohesion and the hysteresis for the purpose of improving endurance of the tire.

Even if the endurance of the tire is improved by this solution, there still exists a need to find other solutions in order to yet further improve the endurance of the tires. In particular, it is an ongoing preoccupation for the manufacturers to find a rubber composition for such internal annular inserts which satisfies a cohesion/hysteresis compromise which makes it possible to further improve the endurance of tires, in particular bearing heavy loads.

SUMMARY

On continuing their research studies, the Applicant Companies have discovered that the use of a specific rubber composition in an internal annular insert located in the bead of the tire, in particular those having an apex radially outside the bead reinforcing circumferential element, makes it possible to greatly improve the endurance of a tire, in particular a tire intended to bear heavy loads. This rubber composition comprises at least one elastomer matrix which is based on at least one polyisoprene having a majority of cis-1,4-enchainments, between 45 and 60 parts per hundred parts by weight of elastomer, phr, of a reinforcing filler comprising from 43 to 55 phr of a reinforcing inorganic filler with a BET specific surface of between 155 and 185 $m^2/g$, a coupling agent for bonding the reinforcing inorganic filler to the elastomer and a vulcanization system.

Thus, the subject-matter of an embodiment of the invention is a tire comprising:
  two beads intended to come into contact with a wheelrim,
  a carcass reinforcement (1) anchored in each bead to a bead reinforcing circumferential element (2),
  each bead comprising at least one internal annular insert, characterized in that this internal annular insert consists of a rubber composition comprising:
    an elastomer matrix based on at least one polyisoprene having a majority of cis-1,4-enchainments,
    between 45 and 60 phr of a reinforcing filler comprising from 43 to 55 phr of a reinforcing inorganic filler with a BET specific surface of between 155 and 185 $m^2/g$,
    a coupling agent for bonding the reinforcing inorganic filler to the elastomer and
    a vulcanization system.

Preferably, an embodiment of the invention relates to a tire as defined above in which the internal annular insert exhibits a meridian section of elongated general shape and exhibits faces joining together to give a point or end (also known as apex) which is located radially outside the bead reinforcing circumferential element (2).

Preferably also, an embodiment of the invention relates to a tire as defined above in which the internal annular insert is an edge gum which is in the form of a ribbon and which is positioned in contact with one end of a strengthening reinforcement, so as to cover this end.

Preferably again, an embodiment of the invention relates to a tire as defined above in which the content of the reinforcing filler is between 45 and 55 phr.

Preferably again, an embodiment of the invention relates to a tire as defined above in which the content of the reinforcing inorganic filler is within a range extending from 45 to 50 phr.

Preferably again, an embodiment of the invention relates to a tire as defined above in which the BET specific surface of the reinforcing inorganic filler is within a range extending from 160 to 180 m²/g.

More preferably, an embodiment of the invention relates to a tire as defined above in which the reinforcing inorganic filler is a silica.

More preferably again, an embodiment of the invention relates to a tire as defined above in which the reinforcing filler consists of a mixture of carbon black and silica.

Preferably, an embodiment of the invention relates to a tire as defined above in which the carbon black is present at a content of less than 10 phr, preferably of less than 6 phr.

Preferably again, an embodiment of the invention relates to a tire as defined above in which the elastomer matrix comprises a predominant fraction by weight of polyisoprene.

More preferably, an embodiment of the invention relates to a tire as defined above in which the elastomer matrix comprises solely polyisoprene.

Preferably, an embodiment of the invention relates to a tire as defined above in which the polyisoprene is selected from the group consisting of natural rubber, a synthetic polyisoprene having a content of cis-1,4-bonds of the isoprene units of greater than 90%, more preferably still greater than 98%, and the mixture of these polyisoprenes.

More preferably, an embodiment of the invention relates to a tire as defined above in which the rubber composition additionally comprises an agent for covering the inorganic filler.

DETAILED DESCRIPTION OF SPECIFIC EMBODIMENTS

I. Measurements and Tests Used

Figure 1:
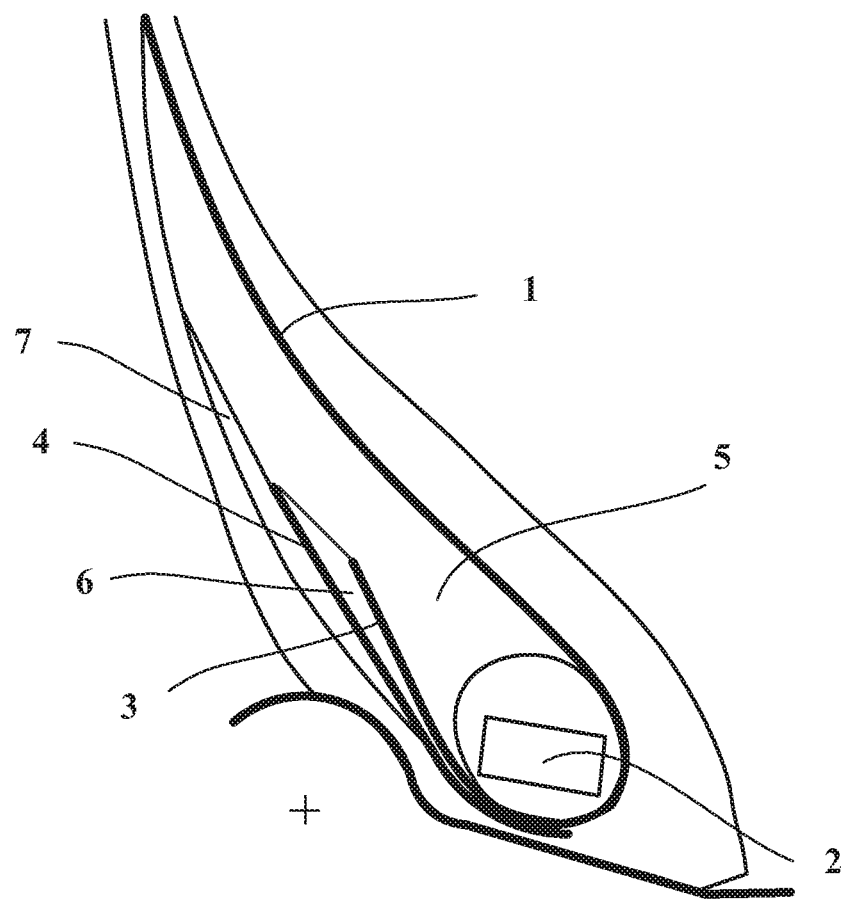
FIG. 1 is a diagrammatic view, in meridian cross-section, of a bead of a tire of a heavy duty vehicle according to an embodiment of the invention.

The BET specific surface is determined according to Standard ISO 4652 (final version of 1994).

The CTAB specific surface is determined according to French Standard NF T 45-007 of November 1987 (method B, now Standard ISO 5794-1, version of June 2010, and ISO 5794-2, version of February 2006).

The endurance of the tires is evaluated by a running test, which consists in measuring the distance travelled in kilometers until tracks visible at the surface appear in the bead region of the tire, the tire being inflated with nitrogen, subjected to a load 1.75 times the nominal load and running at 30 km/h.

The result is expressed by the ratio of the distance travelled by a tire in accordance with the invention to that of a control tire. As the control has an index of 100, a value of greater than 100 indicates that the composition under consideration exhibits a better endurance than the composition taken as control.

FIG. 1 illustrates a specific embodiment of the invention, in that it diagrammatically represents, in its meridian cross section, a bead of a tire of a heavy duty vehicle reinforced by a reinforcing circumferential element (2) which is provided in the form of a bead wire around which is wound a carcass reinforcement (1) in order to form a turn-up (3) positioned axially towards the outside of the carcass reinforcement. This bead additionally comprises, axially towards the outside of the carcass reinforcement, an additional strengthening reinforcement (4).

The bead also comprises:
  an internal annular insert (5) located axially between the turn-up (3) and the carcass reinforcement (1),
  an internal annular insert (6) located axially between the turn-up (3) and the additional strengthening reinforcement (4),
  an internal annular insert (7) located axially outside the additional strengthening reinforcement (4).

The internal annular inserts (5), (6) and (7) all exhibit a meridian section of elongated general shape and terminate in an end (apex) positioned radially outside the bead reinforcing circumferential element (2).

According to an embodiment of the invention, at least one of the internal annular inserts which is located in the bead of the tire is positioned in contact with an end of a strengthening reinforcement so as to cover this end. Such an internal annular insert is known as edge gum. This edge gum is a rubber mixture in the form of a ribbon, that is to say a flat element of uniform thickness. It is generally in calendered form. It can cover the end of the carcass reinforcement (1) or the additional strengthening reinforcement (4). It thus protects the other rubber mixtures located in the bead, such as the other internal annular inserts (5), (6) and (7), which surround the end of a strengthening reinforcement from any attack by a reinforcing thread of this strengthening reinforcement. The reinforcing thread of the strengthening reinforcement, which is of textile or metal, capable of reinforcing a rubber mixture can take any known form and can be provided, for example, in the form of an individual monofilament, of a multifilament fibre, of a cord or of a folded yarn obtained by cabling or twisting operations on multifilament fibres or on monofilament. This protection of the internal annular inserts (5), (6) and (7) by an edge gum according to the present invention makes it possible to increase the endurance of the tire.

According to another embodiment of the present invention, at least one of the internal annular inserts, the meridian section of which is of elongated general shape, which are located in the bead of the tire and which have an apex located radially outside the bead reinforcing circumferential element, such as, for example, the annular inserts (5), (6) and (7) of the specific embodiment described in FIG. 1, consists of a rubber composition comprising an elastomer matrix based on at least one polyisoprene having a majority of cis-1,4-enchainments, between 45 and 60 phr of a reinforcing filler comprising from 43 to 55 phr of a reinforcing inorganic filler with a BET specific surface of between 155 and 185 m²/g, and a coupling agent for bonding the reinforcing inorganic filler to the elastomer.

According to a preferred embodiment of the invention, the two beads of the tire in accordance with the invention each comprise three internal annular inserts, respectively the internal annular insert (5) located axially between the turn-up (3) and the carcass reinforcement (1), the internal annular insert (6) located axially between the turn-up (3) and the additional strengthening reinforcement (4) and the internal annular insert (7) located axially outside the additional strengthening reinforcement (4), each of these internal annular inserts consisting of the rubber composition defined in the preceding paragraph.

In the present description, unless expressly indicated otherwise, all the percentages (%) shown are % by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

II-1. Diene Elastomer

An essential characteristic of the tire in accordance with an embodiment of the invention is that the elastomer matrix of the rubber composition constituting the internal annular insert as described herein comprises a polyisoprene elastomer selected from the group consisting of natural rubber, a synthetic polyisoprene having a majority of cis-1,4-enchainments and their mixture.

The synthetic polyisoprene having a majority of cis-1,4-enchainments exhibits a content (mol %) of cis-1,4-bonds of greater than 90%, more preferably still of greater than 98%. Such polyisoprenes can be synthesized by stereospecific polymerization using initiators of Ziegler Natta type, such as, for example, is described in Patent EP 1 355 960 B1.

According to an alternative form of the embodiment where the polyisoprene elastomer is a mixture of natural rubber and of synthetic polyisoprene having a majority of cis-1,4-enchainments, the portion of natural rubber in this mixture preferably represents more than 50%. More preferably, it is 100%.

According to another alternative form of the embodiment where the polyisoprene elastomer is a mixture of natural rubber and of synthetic polyisoprene having a majority of cis-1,4-enchainments, the portion of synthetic polyisoprene in this mixture is preferably at least 50%; more preferably still, it is 100%.

According to a specific embodiment, the elastomer matrix can additionally comprise another diene elastomer.

The term "diene elastomer" should be understood, in a known way, as meaning an (one or more is/are understood) elastomer composed, at least in part (i.e., a homopolymer or a copolymer), of units resulting from diene monomers (monomers bearing two conjugated or nonconjugated carbon-carbon double bonds).

More particularly, the term "diene elastomer" is understood to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter comprise from 20% to 99% by weight of diene units and from 1% to 80% by weight of vinylaromatic units.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent.

Preferably, the diene elastomer is selected from the group of the highly unsaturated diene elastomers consisting of polybutadienes (abbreviated to "BRs"), synthetic polyisoprenes (IRs), the content of cis-1,4-enchainments of which is not predominant in the said polyisoprenes, butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

According to a preferred embodiment of the invention, the polyisoprene elastomer is the predominant elastomer of the rubber composition of the internal annular insert, that is to say the fraction by weight of the polyisoprene elastomer represents more than 50% of the total weight of elastomer.

According to a more preferred embodiment, the polyisoprene elastomer is the only elastomer which is used in the rubber composition of the internal annular insert.

II-2. Reinforcing Filler

Another essential characteristic of the tire in accordance with an embodiment of the invention is that the rubber composition constituting the internal annular insert as described herein comprises between 45 and 60 phr of a reinforcing filler which comprises from 43 to 55 phr of a reinforcing inorganic filler with a BET surface of between 155 and 185 $m^2/g$.

According to a specific embodiment of the invention, the reinforcing inorganic filler represents at least 85% by weight, more preferably at least 90% by weight, of the reinforcing filler.

The reinforcing filler is typically composed of nanoparticles, the mean size (by weight) of which is less than a micrometer, generally less than 500 nm, most often of between 20 and 200 nm, in particular and more preferably of between 20 and 150 nm.

The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, preferably silica ($SiO_2$), are suitable in particular as reinforcing inorganic fillers.

The silica used can be any reinforcing silica known to a person skilled in the art, in particular any precipitated or fumed silica. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia and the Hi-Sil EZ150G silica from PPG.

Mention may also be made, as reinforcing inorganic filler, of mineral fillers of the aluminous type, in particular alumina ($Al_2O_3$) or aluminium (oxide)hydroxides, or also reinforcing titanium oxides, for example described in U.S. Pat. Nos. 6,610,261 and 6,747,087.

The physical state under which the reinforcing inorganic filler is provided is not important, whether it is in the form of a powder, of microbeads, of granules or also of beads. Of course, the term "reinforcing inorganic filler" is also understood to mean mixtures of different reinforcing inorganic fillers, in particular of highly dispersible silicas as described above.

A person skilled in the art will understand that use might be made, as filler equivalent to the reinforcing inorganic filler described in the present section, of a reinforcing filler of another nature, in particular organic nature, such as carbon black, provided that this reinforcing filler is covered with an inorganic layer, such as silica, or else comprises, at its surface, functional sites, in particular hydroxyl functional sites, requiring the use of a coupling agent in order to establish the bond between the filler and the elastomer. Mention may be made, as example, for example, of carbon blacks for tires, such as described, for example, in the patent documents WO 96/37547 and WO 99/28380.

According to a specific embodiment of the invention, the reinforcing filler comprises a carbon black.

All carbon blacks are suitable as carbon blacks, in particular the blacks conventionally used in tires or their treads ("tire-grade" blacks). Mention will more particularly be made, among the latter, of the reinforcing carbon blacks of the 100, 200 or 300 series or the blacks of the 500, 600 or 700 series (ASTM grades), such as, for example, the N115, N134, N234, N326, N330, N339, N347, N375, N550, N683 or N772 blacks. These carbon blacks can be used in the isolated state, as available commercially, or in any other form, for example as support for some of the rubber additives used. A carbon black of the N300 series is preferred, such as carbon black N330.

According to a preferred embodiment of the invention, the content of reinforcing filler is between 45 and 55 phr, more preferably is greater than 45 phr and it is at most 50 phr.

According to a specific embodiment of the invention, the content of inorganic filler is within a range extending from 45 to 50 phr. Such preferred contents make it possible to optimize the cohesion/hysteresis compromise of the rubber composition constituting the internal annular insert as described herein and consequently to improve the endurance of the tire.

Silica is very particularly preferred as reinforcing inorganic filler.

According to another specific embodiment of the invention, the BET surface of the reinforcing inorganic filler is within a range extending from 160 to 180 $m^2/g$.

According to an alternative form of this specific embodiment of the invention, the inorganic filler is a silica which preferably exhibits a CTAB surface of between 155 and 170 $m^2/g$.

The carbon black, when it is present, is preferably used at a content of less than 20 phr, more preferably of less than 10 phr, more preferably still of less than 6 phr (for example, between 0.5 and 6 phr).

II-3. Coupling Agents

Another essential characteristic of the tire in accordance with an embodiment of the invention is that the rubber composition constituting the internal annular insert as described herein comprises a coupling agent for coupling the reinforcing inorganic filler to the diene elastomer.

It is well known, in order to couple the reinforcing inorganic filler to the diene elastomer, to use an at least bifunctional coupling agent (or bonding agent) intended to provide a satisfactory connection, of chemical and/or physical nature, between the inorganic filler (surface of its particles) and the diene elastomer. Use is made in particular of at least bifunctional organosilanes or polyorganosiloxanes.

This coupling agent (or bonding agent) is at least one at least bifunctional compound and is intended to provide a satisfactory connection, of chemical and/or physical nature, between the inorganic filler (surface of its particles) and the diene elastomer. Use is made in particular of at least bifunctional organosilanes or polyorganosiloxanes.

Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650).

Particularly suitable, without the definition below being limiting, are silane polysulphides corresponding to the following general formula (I):

$$Z\text{-}A\text{-}S_x\text{-}A\text{-}Z, \qquad (I)$$

in which:
x is an integer from 2 to 8 (preferably from 2 to 5);
the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene);
the Z symbols, which are identical or different, correspond to one of the three formulae below:

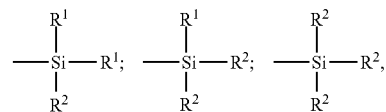

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in the abovementioned Patent Application WO 02/083782 (or U.S. Pat. No. 7,217,751).

Mention will in particular be made, as examples of coupling agents other than an alkoxysilane polysulphide, of bifunctional POSs (polyorganosiloxanes), or else of hydroxysilane polysulphides ($R^2$=OH in the above formula I), such as described, for example, in Patent Applications WO 02/30939 (or U.S. Pat. No. 6,774,255), WO 02/31041 (or US 2004/051210) and WO 2007/061550, or else of silanes or POSs bearing azodicarbonyl functional groups, such as described, for example, in Patent Applications WO 2006/125532, WO 2006/125533 and WO 2006/125534.

Mention will be made, as examples of other silane sulphides, for example, of the silanes bearing at least one thiol (—SH) functional group (referred to as mercaptosilanes) and/or at least one masked thiol functional group, such as described, for example, in patents or patent applications U.S. Pat. No. 6,849,754, WO 99/09036, WO 2006/023815, WO 2007/098080, WO 2008/055986 and WO 2010/072685.

Of course, use might also be made of mixtures of the coupling agents described above, as described in particular in the abovementioned Application WO 2006/125534.

The content of coupling agent is advantageously less than 10 phr, it being understood that it is generally desirable to use as little as possible of it. Typically, the content of coupling agent preferably represents from 0.5% to 15% by weight, with respect to the amount of inorganic filler. Its content is preferably between 0.5 and 8 phr, more preferably within a range extending from 3 to 5 phr. This content is easily adjusted by a person skilled in the art according to the content of inorganic filler used in the rubber composition.

According to a specific embodiment of the invention where the reinforcing inorganic filler is a silica, the coupling agent can be contributed by silica, the surface of which has been modified beforehand by an organosilane, such as bis(3-triethoxysilylpropyl)tetrasulphide or mercaptosilanes. Such silicas are sold by Evonik and PPG under the respective names "Coupsil" and "Ciptane".

II-4. Vulcanization System

Another essential characteristic of the tire in accordance with an embodiment of the invention is that the rubber composition constituting the internal annular insert as described herein 1 comprises a vulcanization system, that is to say a system based on sulphur (or on a sulphur-donating agent) and on a primary vulcanization accelerator.

Use may be made, as accelerator, of any compound capable of acting as accelerator of the vulcanization of diene elastomers in the presence of sulphur, in particular accelerators of the type consisting of thiazoles and their derivatives, accelerators of the types consisting of thiurams, zinc dithiocarbamates, sulphenamides. These accelerators are, for example, selected from the group consisting of 2-mercaptobenzothiazyl disulphide (abbreviated to "MBTS"), tetrabenzylthiuram disulphide ("TBZTD"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC") and the mixtures of these compounds.

An accelerator of the family of the sulphenamides, such as CBS is preferred.

The sulphur is preferably used at a content equal to or greater than 1.8 phr. In the case where a sulphur-donating agent is used in place of or in combination with sulphur, the content of this agent is adjusted so that the total sulphur content is preferably equal to or greater than 1.8 phr.

According to a preferred embodiment, the sulphur content is within a range extending from 1.8 to 4 phr, more preferably from 2 to 3 phr.

The primary vulcanization accelerator is preferably used at a content of between 1 and 3 phr, more preferably still of between 1 and 2 phr.

Additional to this base vulcanization system are various known secondary accelerators or vulcanization activators, such as zinc oxide, stearic acid or equivalent compounds, or guanidine derivatives (in particular diphenylguanidine), incorporated during the first nonproductive phase and/or during the productive phase as are described subsequently.

According to another specific embodiment of the invention, the content of zinc oxide is less than 8 phr, more preferably less than 6 phr.

II-5. Various Additives

The rubber composition can also comprise all or a portion of the usual additives generally used in elastomer compositions intended for the manufacture of tires or semi-finished products for tires, such as, for example, plasticizers, pigments, protection agents, such as antiozonants or antioxidants, antifatigue agents, antireversion agents, reinforcing resins (such as resorcinol or bismaleimide), methylene acceptors (for example, phenolic novolak resin) or methylene donors, for example hexamethylene tetramine (HMT).

According to a specific embodiment of the invention, the rubber composition comprises, in addition to a coupling agent, a covering agent for the inorganic fillers which improves the dispersion of the inorganic filler in the rubber matrix. Such an embodiment is preferred when the reinforcing inorganic filler is not a silica, the surface of which has been modified beforehand by an organosilane. The covering agent can be a hydrolysable silane, such as an alkylalkoxysilane, a polyol, in particular a polyalkylene glycol, such as a polyethylene glycol, a polyether, an amine, a guanidine, such as diphenylguanidine, a hydroxylated or hydrolysable polyorganosiloxane, and their mixtures. The content of the covering agent is easily adjusted by a person skilled in the art according to the content of inorganic filler used in the rubber composition. It is preferably between 0 and 3 phr, preferably between 0.2 and 3 phr and more preferably between 0.5 and 3 phr.

II-6. Manufacture of the Rubber Composition and of the Tire

The rubber composition is manufactured in appropriate mixers, using two successive phases of preparation well known to a person skilled in the art: a first phase of thermomechanical working or kneading ("non-productive" phase) at high temperature, up to a maximum temperature between 110° C. and 190° C., preferably between 130° C. and 180° C., followed by a second phase of mechanical working ("productive" phase) down to a lower temperature, typically of less than 110° C., for example between 20° C. and 100° C., during which finishing phase the vulcanization system is incorporated.

The first stage of kneading is generally carried out by incorporating the reinforcing filler in the elastomer, in one or more goes, while kneading thermomechanically.

The first two stages can be carried out consecutively on one and the same mixer or be separated by a stage of cooling to a temperature of less than 100° C., the final stage then being carried out on a second mixer.

By way of example, the first phase is carried out in a single thermomechanical stage during which, in a first step, all the necessary base constituents (the elastomer, in all or in part, the reinforcing filler, in all or in part, and the coupling agent, if necessary) are introduced into an appropriate mixer, such as a normal internal mixer, followed, in a second step, for example after kneading for one to two minutes, by the remaining elastomer and reinforcing filler, if appropriate, the other additives, optional additional covering agents or processing aids, with the exception of the vulcanization system. After cooling the mixture thus obtained, the vulcanization system is then incorporated in an external mixer, such as open mill, maintained at a low temperature (for example, between 20° C. and 100° C.). The combined mixture is then mixed for a few minutes, for example between 2 and 15 min.

The final composition thus obtained is subsequently calendered, for example in the form of a sheet or of a plaque, in particular for laboratory characterization, or also extruded, to form a profiled element for the purpose of its use as internal annular insert as defined in claim 1.

The vulcanization is carried out in a known way at a temperature generally of between 120° C. and 200° C. for a sufficient time which can be varied, for example, between 5 and 90 min depending in particular on the curing temperature, the vulcanization system adopted and the vulcanization kinetics of the composition under consideration.

The invention, in another embodiment, relates to the tires described above both in the raw state (that is to say, before curing) and in the cured state (that is to say, after crosslinking or vulcanization).

The tire according to an embodiment of the invention is preferably a tire for bearing heavy loads, in particular a tire equipping heavy duty vehicles or earthmoving equipment.

The examples which follow illustrate the invention without, however, limiting it.

III. Examples of the Implementation of the Invention

III-1. Preparation of the Rubber Compositions

The tests which follow are carried out in the following way: the natural rubber, the silica, the polyethylene glycol and the silane polysulphide supported on carbon black are introduced into an internal mixer, 70% filled and having an initial vessel temperature of approximately 50° C., followed, after kneading for one to two minutes, by the various other ingredients, such as the antioxidant, the stearic acid and the zinc oxide. Thermomechanical working (nonproductive phase) is then carried out in one stage (total duration of the kneading equal to approximately 5 min), until a maximum "dropping" temperature of approximately 165° C. is reached. The mixture thus obtained is recovered and cooled and then the vulcanization system (sulphur and sulphonamide accelerator) and the hexamethylenetetramine are added on an external mixer (homofinisher) at 30° C., the combined mixture being mixed (productive phase) for approximately from 5 to 6 min.

The compositions thus obtained are subsequently calendered in the form of plaques (thickness of 2 to 3 mm) or of thin sheets of rubber, for the measurement of their physical or mechanical properties, or extruded in the form of articles which can be used directly, after cutting and/or assembling to the desired dimensions, to obtain a profiled element which can be used as internal annular insert as defined in claim 1.

III-2. Tests

The aim of the tests is to show the improvement in the endurance of the tire in accordance with the invention, with respect to a tire not in accordance with the invention.

Two compositions C1 and C2 were manufactured in accordance with the process described in the preceding section. These compositions, the formulations of which are described in detail in Table 1 (where the amounts are expressed in phr), differ in particular in their silica content. The composition C1 in accordance with the invention comprises 45 phr of a silica with a BET specific surface equal to 160 $m^2/g$, whereas the control composition C2 in accordance with the teaching of the prior art comprises only 35 phr of the same silica. The silane contents are consequently adjusted to the silica content and are respectively 4.5 phr for C1 and 3.5 phr for C2.

The compositions C1 and C2 were used to constitute the internal annular inserts (5), (6) and (7) of the respective tires T1 and T2, each of 315/60 R22.5 size. Apart from these differences relating to the composition of the internal annular insert, the tires T1 and T2 are identical.

The tire T1 is in accordance with the invention, since it comprises an internal annular insert consisting of the composition C1. The tire T2 is not in accordance with the invention.

III-3. Results

The endurance performances of the tires T1 and T2 appear in Table 2.

Unexpectedly, the tire T1 in accordance with the invention, with a performance index of 150, exhibits a much better endurance than the control tire T2.

These results show that, contrary to the teaching of the prior art prompting instead not to exceed 35 phr of silica, the rubber composition according to the invention makes it possible, unexpectedly, to offer a cohesion/hysteresis property compromise which is reflected by a strong improvement in the performance of the endurance of the tire.

To sum up, the use of a rubber composition defined by a specific content of reinforcing filler and a specific content of reinforcing inorganic filler with a given BET surface area in a tire bead internal annular insert makes it possible to further improve the endurance of the tire, even with respect to an optimized solution.

TABLE 1

Formulation of the rubber compositions (in phr)

| Composition | C1 (invention) | C2 (comparative) |
|---|---|---|
| NR (1) | 100 | 100 |
| Silica (2) | 45 | 35 |
| Carbon black (3) | 4.5 | 3.5 |
| PEG 4000 (4) | 1 | 0 |
| Silane (5) | 4.5 | 3.5 |
| Antioxidant (6) | 1.7 | 1.7 |
| ZnO | 4.5 | 4.5 |
| Stearic acid | 1 | 1 |

TABLE 1-continued

Formulation of the rubber compositions (in phr)

| Composition | C1 (invention) | C2 (comparative) |
|---|---|---|
| Sulphur | 2.4 | 2.4 |
| Accelerator (7) | 1.9 | 1.9 |
| HMT (8) | 0.25 | 0.25 |

(1) Natural rubber;
(2) Silica, Zeosil 1165MP from Rhodia (BET: 160 m²/g, CTAB: 157 m²/g);
(3) Carbon black N330, introduced in the form of a mixture with TESPT according to a 1/1 ratio by weight, sold under the name X 50-S by Evonik;
(4) Polyethylene glycol with a molecular weight of 4000, sold under the name Pluriol 4000 by BASF;
(5) TESPT supported on carbon black (X50-S from Evonik);
(6) N-(1,3-Dimethylbutyl)-N'-phenyl-paraphenylenediamine (6-PPD);
(7) N-Cyclohexyl-2-benzothiazolesulphenamide (Santocure CBS from Flexsys);
(8) Hexamethylenetetramine from Degussa, known as Methenalink.

TABLE 2

Performances of the tires

| | Tire | |
|---|---|---|
| | T1 | T2 |
| Composition | C1 | C2 |
| Silica content | 45 | 35 |
| Endurance | 150 | 100 |

The invention claimed is:

1. A tire comprising:
two beads intended to come into contact with a wheelrim,
a carcass reinforcement anchored in each bead,
each bead comprising at least one internal annular insert disposed radially outwardly of and containing a bead reinforcing circumferential element, wherein the at least one internal annular insert consists of a rubber composition comprising:
an elastomer matrix based on at least one polyisoprene having a majority of cis-1,4-enchainments,
between 45 and 60 parts per hundred parts by weight of elastomer, phr, of a reinforcing filler comprising a reinforcing inorganic filler, the reinforcing inorganic filler including silica, the silica is in a content of from 43 to 55 phr by weight of the elastomer and has a BET specific surface area of between 155 and 185 m²/g,
a coupling agent for bonding the reinforcing inorganic filler to the elastomer, and
a vulcanization system,
wherein the coupling agent is an at least bifunctional organosilane or an at least bifunctional polyorganosiloxane, or a silane polysulphide corresponding to the following general formula (I):

$$Z-A-S_x-A-Z, \quad (I)$$

wherein:
x is an integer from 2 to 8;
the A symbols, which are identical or different, represent a divalent hydrocarbon radical;
the Z symbols, which are identical or different, correspond to one of the three formulae below:

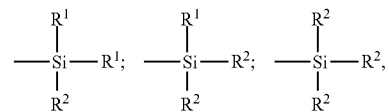

wherein:
$R^1$ radicals, which are substituted or unsubstituted and identical to or different from one another, represent a $C_1$-$C_{18}$ alkyl, $C_5$-$C_{18}$ cycloalkyl or $C_8$-$C_{18}$ aryl group;
$R^2$ radicals, which are substituted or unsubstituted and identical to or different from one another, represent a $C_1$-$C_{18}$ alkoxyl or $C_5$-$C_{18}$ cycloalkoxyl group.

2. The tire according to claim 1, wherein the at least one internal annular insert exhibits a meridian section of elongated general shape and exhibits faces joining together to give a point or end which is located radially outside the bead reinforcing circumferential element.

3. The tire according to claim 1, wherein the at least one internal annular insert is an edge gum which is in a form of a ribbon and which is positioned in contact with an end of a strengthening reinforcement so as to cover this end.

4. The tire according to claim 1, wherein a content of the reinforcing filler is between 45 and 55 phr.

5. The fire according to claim 1, wherein a content of the reinforcing inorganic filler is within a range extending from 45 to 50 phr.

6. The tire according to claim 1, wherein the BET specific surface area of the silica is within a range extending from 160 to 180 m²/g.

7. The tire according to claim 1, wherein the reinforcing filler consists of a mixture of carbon black and the silica.

8. The tire according to claim 1, wherein the reinforcing filler further includes carbon black, and the carbon black is present at a content of less than 10 phr.

9. The tire according to claim 1, wherein the elastomer matrix comprises a predominant fraction by weight of polyisoprene.

10. The tire according to claim 9, wherein the elastomer matrix comprises solely polyisoprene.

11. The tire according to claim 1, wherein the at least one polyisoprene is selected from the group consisting of at least one natural rubber and a synthetic polyisoprene having a content of cis-1,4-bonds of the isoprene units of greater than 90%.

12. The tire according to claim 1, wherein the rubber composition further comprises an agent for covering the inorganic filler.

13. The tire according to claim 12, wherein the covering agent is selected from the group consisting of hydrolysable silanes, polyols, polyethers, amines, guanidines, hydroxylated or hydrolysable polyorganosiloxanes, and their mixtures.

14. The tire according to claim 13, wherein the covering agent is a polyol.

15. The tire according to claim 12, wherein the covering agent is used at a content of between 0 and 3 phr.

* * * * *